Oct. 25, 1927.  H. V. LUDWICK  1,646,866
WHEEL
Filed Aug. 1, 1922  2 Sheets-Sheet 2
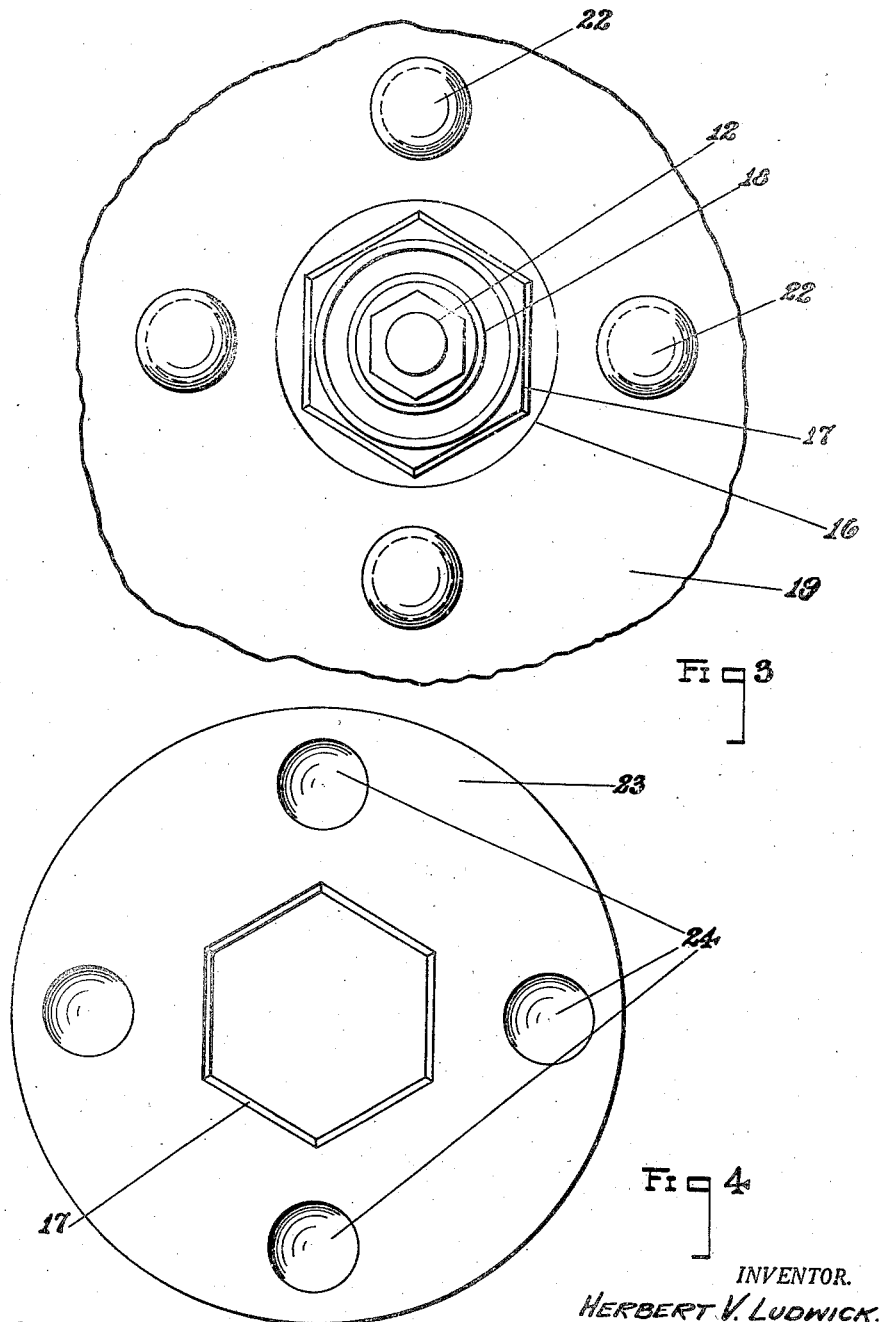
INVENTOR.
HERBERT V. LUDWICK.

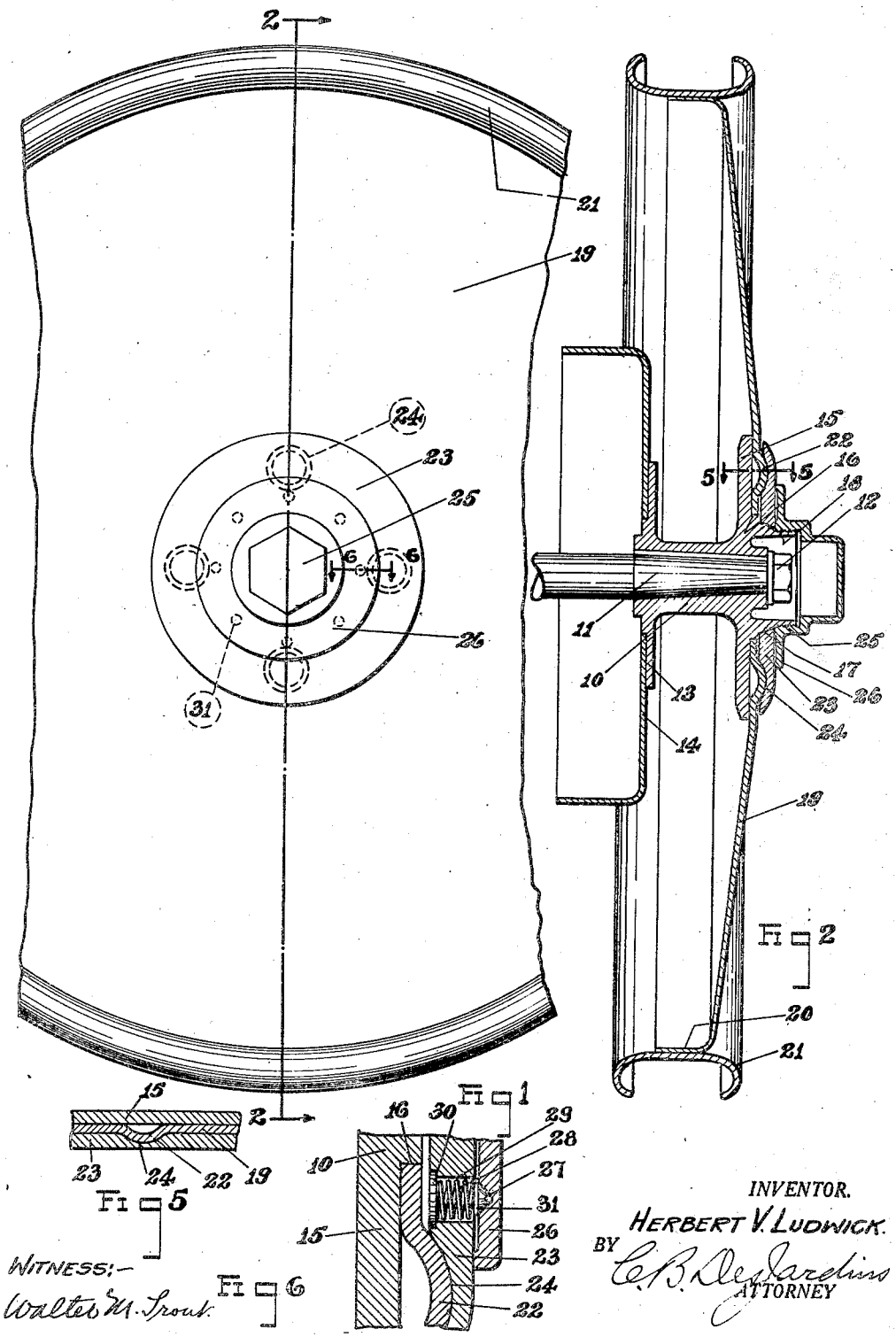

Patented Oct. 25, 1927.

1,646,866

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

WHEEL.

Application filed August 1, 1922. Serial No. 578,898.

My invention relates to improvement in wheels and has to do, more particularly, with demountable disc wheels for automobiles.

The main object of my invention is to provide a demountable disc wheel construction which is simple, effective, light and may be manufactured at a low cost.

A further object of my invention is to provide a demountable disc wheel construction having an improved driving connection between the hub and the disc.

Another object of my invention is to provide a demountable disc wheel construction having a hub which is very light and inexpensive to manufacture.

A further object of my invention is to provide a demountable disc wheel construction in which the driving connection between the hub and the wheel is effected by clamping a portion of the disc between two members on the hub, the disc being so formed that this clamping action places portions of the disc under compression, setting up a pressure acting on the retaining means for the disc and tending to hold it tight.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is a view in elevation of a wheel embodying my invention.

Fig. 2 is a sectional view through the wheel taken on the line 2—2 of Fig. 1.

Fig. 3 is a view of the wheel hub in end elevation, showing the disc mounted thereon and the hub cap and driving ring removed.

Fig. 4 is a plan view of the driving ring, looking at that side thereof which is presented toward the disc.

Fig. 5 is a detail, sectional view, taken on the line 5—5 of Fig. 2, and

Fig. 6 is a detail sectional view, taken on the line 6—6 of Fig. 1.

In the drawings, the same reference numerals refer to the same parts throughout the several views, and the sectional views are taken looking in the direction of the arrows at the ends of the section lines.

A demountable disc wheel comprises a hub and a demountable disc carried by the hub and supporting the rim and tire. It is necessary to provide a driving connection between the hub and the disc of such a nature that the two parts turn as one, in use, but may be quickly and easily separated when it is desired to remove the disc in changing wheels. It is particularly desirable that the weight of these wheels be kept as low as possible and, of course, it is always an object to cut the cost of manufacture as much as possible, while producing a wheel which is strong and durable and stands up under the conditions which it has to meet in use. In demountable wheel constructions in use at the present time, the construction of the hub, for the purpose of effecting a driving connection with the disc, is such as to add greatly to the weight and cost of the hub. The purpose of my invention is to provide a demountable wheel construction having a hub which is very greatly simplified, is light and can be manufactured at a low cost. It is also a purpose of my invention to provide a demountable disc which may be very readily formed for connection with the hub of the wheel. I propose to provide a hub having a radial flange on which the disc wheel is mounted. I provide a driving member or ring which is non-rotatably mounted on the hub and I clamp the central portion of the disc between the driving member or ring and the hub flange. I propose to provide means whereby the driving ring and the disc are locked to each other, when the driving ring is clamped in place, so as to prevent rotation of the disc relative to such driving ring. The purposes of my invention may be accomplished by providing a hub with a radial flange against which the disc is held by a driving ring which is mounted on a driving shoulder formed on the hub of such shape as to prevent rotation of such driving ring relative to the hub. In order to prevent any rotation of the disc with respect to the driving ring, I propose to form driving bosses in the disc which seat in corresponding recesses in the driving ring. The driving ring is forced against the disc to yieldingly clamp the same against the hub flange by a hub cap screwed on the end of the hub.

The demountable disc wheel illustrated in the accompanying drawings as constituting one embodiment of my invention consists of the hub, 10, rigidly secured to the axle shaft, 11, by the nut, 12, and the usual key. The hub, 10, has the rear flange, 13, carrying the brake drum, 14, and the outer radial flange, 15, to which the central portion of the demountable disc is clamped. A cylindrical shoulder, 16, is formed at the base of the flange, 15, and this shoulder receives the edge of a central opening formed in the demountable wheel disc, 19. The latter has the peripheral flange, 20, to which the rim, 21, is secured.

The driving connection between the demountable disc, 19, and the hub, 10, is effected in the following manner. In front of the cylindrical shoulder, 16, the hub is provided with a tapered driving shoulder, 17, of frustro-pyramidal form and in front of this the end of the hub is externally threaded, as at 18. A driving ring, 23, has a central opening therein, the edge of which conforms to and fits the driving shoulder, 17, of the hub, so that the driving ring is compelled to turn with the hub, while it may be adjusted longitudinally with respect to the axis thereof. In order to establish a driving connection between the disc and the driving ring, 23, I form a plurality of convex driving bosses, 22, in the disc, arranged at equal radial distances with respect to the center thereof. In this case I have shown four of these driving bosses. I provide the inner face of the driving ring, 23, with corresponding concave recesses, 24, arranged at equal radial distances from the center of the ring and adapted to engage said convex bosses, as illustrated in Figs. 2, 5 and 6. A hub cap, 25, is screwed on the externally-threaded portion, 18, of the hub, and the radially extending flange, 26, of said hub cap engages the driving ring, 23, and forces the same toward the hub flange, 15, clamping the central portion of the disc between said flange and driving ring. This causes the driving bosses, 22, to seat in the concave recesses, 24, of the driving ring and such bosses are compressed somewhat by the force applied in screwing up the hub cap so as to set up a spring pressure acting like a spring washer on the driving ring and hub cap to maintain the latter tight.

In order to prevent unintentional rotation of the hub cap, I provide a spring-pressed detent carried by the driving ring and coacting with the hub cap. This detent consists of the plunger, 27, carried by the spring, 28, positioned in the opening, 29, of the ring, 23, and held therein by the screw, 30. The plunger, 27, has a tapered nose which snaps into engagement with one of the recesses, 31, in the flange, 26, of the hub cap, when such recesses are brought into line with it. In order to rotate the hub cap, it is necessary to apply sufficient force to depress the spring, 29, and, therefore, this latch device tends to prevent unintentional rotation of the hub cap.

The operation of this demountable wheel construction will be evident from the foregoing description. The demountable disc, 19, may be removed by unscrewing the hub cap, 25, and removing it and the driving ring, 23. The disc, 19, may be removed and another disc placed upon the hub and clamped in position on the driving shoulder, 17, and forcing said driving ring into clamping engagement with the disc by screwing up the hub cap, 25. The hub, 10, is of very simple construction, is light in weight and requires only a few simple machine operations for its manufacture. The bosses, 22, may be formed in the disc, 19, at the same time that the disc is pressed to the required form for the wheel, so that the construction of the demountable disc is very simple and inexpensive. The driving ring, 23, is a part which can be formed very easily and cheaply. The hub cap is a simple stamping. As a result, this wheel construction is very light and inexpensive to manufacture but, nevertheless, it is strong and durable and meets the demands and requirements coming upon such a wheel construction in use on the road. I have shown a tapered disc, 19, and this is to be preferred inasmuch as it decreases the peripheral weight of the wheel, but a disc of uniform thickness might be used without departing from the spirit of my invention. I have shown a driving shoulder, 17, on the hub, of frustro-pyramidal form but I might use a shoulder of different form having any suitable arrangement for interlocking with the driving ring to prevent the rotation thereof, while permitting movement of the driving ring longitudinally of the wheel axis.

I am aware that the wheel construction illustrated in the accompanying drawing may be changed considerably without departing from the spirit of my invention and, therefore, I claim my invention broadly, as indicated by the appended claims.

Having thus described my invention, what I claim as new and useful and desire to secure by Letters Patent of the United States is:

1. In a wheel the combination of a hub, a disc mounted on said hub and adapted to carry a wheel rim, a driving ring mounted on the hub and engaging the disc and having a face to face driving engagement with a radially extending face of said disc and a nut screwed on the hub and engaging the driving ring to force it against the disc and clamp the disc between said ring and a portion of the hub.

2. In a wheel the combination of a hub, a disc mounted on said hub and adapted to carry a wheel rim, a driving ring non-rotatably and removably mounted on said hub and engaging the disc and having a face to face driving engagement with a radially extending face of said disc and a nut screwed on the hub and engaging the driving ring to force it against the disc and clamp the disc between said ring and a portion of the hub.

3. In a wheel the combination of a hub having a driving shoulder of non-circular cross-section, a disc mounted on said hub and adapted to carry a wheel rim, a driving ring fitting said driving shoulder and removably mounted thereon and having a face to face driving engagement with a radially extending face of said disc, and a nut screwed on said hub and engaging the driving ring to force it against the disc and clamp the disc between said ring and a portion of the hub.

4. In a wheel the combination of a hub, a disc mounted on said hub and adapted to carry a wheel rim, a driving ring mounted on the wheel hub and non-rotatable with respect thereto and having a face to face driving engagement with a radially extending face of said disc, said disc and driving ring having co-fitting interengaging portions preventing relative rotation of disc and ring, and a nut screwed on the hub and engaging the driving ring to force it against the disc and clamp the disc between said ring and a portion of the hub.

5. In a wheel the combination of a hub having a radial flange, a disc mounted on said hub and adapted to carry a wheel rim and having a face to face engagement with a radially extending face of said flange, a driving ring removably and non-rotatably mounted on the hub and having a face to face driving engagement with a radially extending face of said disc, said ring and disc having co-fitting interengaging portions preventing relative rotation of said ring and disc, and a nut screwed on said hub and engaging the driving ring to force it against the disc and clamp the disc between said ring and flange.

6. In a wheel the combination of a hub having a radial flange and a driving shoulder of non-circular cross-section at the base of said flange, a disc mounted on said hub and adapted to carry a wheel rim and having a face to face engagement with a radially extending face of said disc, a driving ring fitting and removably mounted on said driving shoulder and having a face to face driving engagement with a radially extending face of said disc, said disc and ring having co-fitting interengaging portions preventing relative rotation of disc and ring, and a nut screwed on the hub and engaging the ring to force it against said disc and clamp the disc between said ring and flange.

7. In a wheel the combination of a hub having a radial flange, a disc mounted on said hub and engaging said flange and having a face to face engagement with a radially extending face of said disc, a driving ring removably and non-rotatably mounted on said hub, and having a face to face driving engagement with a radially extending face of said disc, means preventing relative rotation of said ring and disc, and means for forcing said ring against the disc to clamp the disc between said ring and flange.

8. In a wheel the combination of a hub having a radial flange, a cylindrical shoulder at the base of said flange and a frustro-pyramidal driving shoulder in front of said cylindrical shoulder, a disc having a central opening fitting said cylindrical shoulder and a plurality of driving bosses arranged at equal radial distances from the center of the disc, said disc having a face to face engagement with a radially extending face of said flange, a driving ring having a portion fitting said driving shoulder and a plurality of recesses adapted to receive said driving bosses, and a hub cap screwed on said hub and engaging the driving ring to force it against the disc.

9. In a wheel the combination of a hub, a disc mounted on said hub and adapted to carry a wheel rim, a driving ring removably and non-rotatably mounted on the hub and having a face to face driving engagement with a radially extending face of said disc, said disc and ring having co-fitting interengaging portions preventing relative rotation of the disc and ring, a nut screwed on the hub and engaging said ring to force it against the disc and clamp the latter between said ring and a portion of the hub, and means for preventing inadvertent rotation of the nut.

10. In a wheel the combination of a hub, a disc mounted on said hub and adapted to carry a wheel rim, a driving ring removably and non-rotatably mounted on the hub and having a face to face driving engagement with a radially extending face of said disc, said disc and ring having co-fitting interengaging portions preventing relative rotation of the disc and ring, a nut screwed on the hub and engaging said ring to force it against the disc and clamp the latter between said ring and a portion of the hub, and means carried by the nut and cooperating with portions of the driving ring to prevent inadvertent rotation of the nut.

11. In a wheel the combination with a hub, a disc mounted on said hub and adapted to carry a wheel rim and having a face to face engagement with a radially extending face of said hub, and a driving ring removably and non-rotatably mounted on the hub and having a face to face driving engagement with a radially extending face of said disc, said disc and ring having co-fitting interengaging portions preventing relative rotation of the disc and ring, of a nut screwed on the hub and engaging said ring to force it against the disc and clamp the latter between said ring and a portion of the hub, and a spring-pressed detent carried by said driving ring and cooperating with a plurality of recesses formed in said nut to prevent inadvertent rotation of said nut.

12. In a vehicle wheel, the combination with a hub having a radially extending flange, of a wheel disc extending radially adjacent said flange, a clamping ring extending radially adjacent said disc, and a nut on said hub and adjacent said ring for forcing said ring against said disc, said hub and disc and ring having face to face engagement with the adjacent elements of these parts and being clamped together with said disc held between said flange and said ring.

13. An automobile wheel comprising a hub having a radially extending flange, a disc mounted on said hub in non-driving engagement with said flange, a combined driving and clamping ring having positive driving engagement with both said hub and the radially extending face of said disc.

14. An automobile wheel comprising a hub having a radially extending flange, a wheel disc mounted on said hub having non-driving engagement with said hub, and a driving ring through which said disc is clamped to said flange which ring has driving engagement with said hub and also positive driving engagement with the disc in a zone radially removed from the body of the hub.

15. An automobile wheel having a hub comprising a radially extending flange, a driving and clamping ring having positive driving engagement with the hub and through which the disc may be clamped against said flange, and the wheel disc so clamped and having integral formations within the clamped zone through which it is positively driven from said clamping ring.

16. An automobile wheel comprising a hub having a radially extending flange, a driving ring adapted to clamp a disc on said flange and having positive driving engagement with the hub, the disc being clamped between the driving ring and the flange and having non-driving connection with the flange but positive driving connection with the driving ring through the intermediary of coacting projections of a self-centering character.

17. In a vehicle wheel the combination of a hub having a radially extending face portion, a disc mounted on the hub and having a face to face engagement with said radially extending face portion of said hub, means to clamp the same on the hub, and means intermediate the clamping member and disc interlocked commonly with the disc and hub, said interlocked means having a face to face engagement with a radially extending face of said disc, whereby the driving torque is transmitted from the hub to the disc through the intermediate member.

In testimony whereof, I affix my signature.

HERBERT V. LUDWICK.